UNITED STATES PATENT OFFICE.

ALBERT F. STEVENSON, OF RIDGEWOOD, NEW JERSEY, ASSIGNOR TO ALBERT W. JOHNSTON, OF NEW YORK, N. Y.

TREATMENT OF BUTTER-FATS.

1,397,663.     Specification of Letters Patent.     Patented Nov. 22, 1921.

No Drawing.     Application filed February 4, 1920. Serial No. 356,197.

*To all whom it may concern:*

Be it known that I, ALBERT F. STEVENSON, a citizen of the United States of America, residing at Ridgewood, in the county of Bergen and State of New Jersey, have invented certain new and useful Improvements in the Treatment of Butter Fats, of which the following is a full, clear, and exact description.

When pure butter fat is produced either from milk, cream or butter, by the processes which are set forth in pending applications filed by Phelps, Stevenson and Baker, notably application Serial No. 306,808, filed June 26, 1919, it sometimes happens that the product is not wholly free from a foreign and objectionable flavor. This may occur if the butter fat is produced from a strong flavored butter or from cream which has been allowed to become very sour.

The removal of such flavor is most desirable but a by no means easy or economical operation, but I have found that it may be done by treating the affected fat with an alkaline solution such as a dilute solution of sodium hydroxid, or of caustic soda. If the treatment is properly carried out the undesirable flavor is wholly removed without any noticeable effect upon the butter fat.

In carrying out the alkaline treatment, however, I have found a slight tendency toward saponification of the butter fat in the alkaline liquor to exist, and that the small amount of soap which results, tends to emulsify the fat and prevent a clear separation of the oil and water. This objection, however, I have overcome by subjecting the treated butter fat to a washing with a slightly acidulated water, of the same nature as that which I have heretofore applied in the process of producing the butter fat itself.

I accordingly proceed as follows: The clear butter fat, however produced, in a fluid condition or prepared by melting the solid fat, is mixed with several times its own volume of water to which has been added approximately one tenth of one per cent. of sodium hydroxid, this proportion being varied slightly according to the acidity of the fat, and is washed as by being passed through a cream separator. The issuing stream of fat and emulsified fat is then diluted with several times its volume of slightly acidulated water having a hydrogen ion concentration slightly in excess of ph—4.5 and passed through a second separator from which there will issue a clear stream of substantially pure anhydrous butter fat.

The use of any alkaline solution capable of uniting with and dissolving the free fatty acids such as casein of the imperfect butter fat brings these constituents to a condition in which they may be readily removed by washing with an acidulated solution. The acid in this solution, as indicated above, should be sufficient in amount to more than merely precipitate the dissolved impurities back with the product and to remove them.

What I claim as my invention and desire to secure by Letters Patent is:

In the manufacture of pure anhydrous butter fat from milk, cream or butter, the process of removing from the fat any objectionable flavor when it exists, which consists in washing the separated butter fat with an alkaline solution, and rewashing the resulting product with an acidulated solution of a strength which is capable of removing the impurities dissolved by the alkaline solution.

In testimony whereof I hereunto affix my signature.

ALBERT F. STEVENSON.